United States Patent [19]

Sakamoto

[11] Patent Number: 4,461,035
[45] Date of Patent: Jul. 17, 1984

[54] TELEVISION SYNCHRONOUS RECEIVER

[75] Inventor: Yoichi Sakamoto, Takatsuki, Japan

[73] Assignee: Matsushita Electric Industrial Co., Ltd., Osaka, Japan

[21] Appl. No.: 379,994

[22] Filed: May 19, 1982

[30] Foreign Application Priority Data

May 22, 1981 [JP] Japan .................................. 56-78215
Jun. 26, 1981 [JP] Japan ................................. 56-100270

[51] Int. Cl.³ .......................... H03J 7/02; H04N 5/50
[52] U.S. Cl. .................................... 455/164; 455/165; 329/50; 358/193.1; 358/195.1
[58] Field of Search ............... 455/165, 164, 182, 183, 455/260, 265, 324; 329/50; 358/188, 191.1, 193.1, 195.1; 331/16, 17, 20, 22

[56] References Cited

U.S. PATENT DOCUMENTS

| | | | |
|---|---|---|---|
| 4,091,410 | 5/1978 | Citta | 329/50 |
| 4,163,259 | 7/1979 | Skerlos | 455/182 |
| 4,271,434 | 6/1981 | Sakamoto | 358/193.1 |
| 4,322,751 | 3/1982 | Hongu et al. | 358/195.1 |

*Primary Examiner*—Jin F. Ng
*Attorney, Agent, or Firm*—Wenderoth, Lind & Ponack

[57] ABSTRACT

A television synchronous receiver is arranged to maintain a 90° phase difference in the broad frequency band of a TV broadcast between a local oscillator signal and another local oscillator signal. This allows a pair of synchronous detectors to detect the in phase components and quadrature components of a received television broadcast signal. A Costas loop is utilized in the generation of the 90° phase difference.

4 Claims, 7 Drawing Figures

TELEVISION SYNCHRONOUS RECEIVER

BACKGROUND OF THE INVENTION

This invention relates to a television synchronous receiver.

A conventional television electronic tuner uses resonant circuits consisting of a diode and an inductor in each of a radio frequency input circuit, an interstage double tuning circuit and a local oscillating circuit. Since such a TV electronic tuner uses four varactor diodes whose voltage-capacitance characteristics slightly differ from one to another and since the tuner has the double tuning circuit, it is necessary to adjust the inductance of the inductor and the coupling coefficient of the double tuning circuit to obtain the desired frequency tracking and selectivity. For this reason, circuit integration and manufacturing automation of the TV electronic tuner becomes difficult.

SUMMARY OF THE INVENTION

It is an object of the present invention to provide a television synchronous receiver which does not require the adjustment of the inductance and the coupling coefficient of the coils.

It is another object of the present invention to provide a phase shifter which maintains a 90° phase difference in the broad frequency band of a TV broadcast between a local oscillator signal and another local oscillator signal which are to be used.

A feature of the present invention is the provision of the synchronous receiving of a TV broadcast signal by applying a Costas loop to television receivers.

Another feature of the present invention is the provision of maintaining a 90° phase shift in a band TV frequency band between two local oscillator signals by applying a PLL to the 90° phase shifter.

These and other objects, features and advantages will become fully apparent from the following description.

BRIEF DESCRIPTION OF THE DRAWINGS

Details of this invention will be described hereinafter with reference to the accompanying drawings, in which:

FIG. 3 (b) is a diagram showing the frequency characteristics of a video signal amplifier which has the characteristics to compensate for the above mentioned detected output characteristics and whose characteristics has a trap for the sound intermediate frequency carrier;

FIG. 1 shows a block diagram of an embodiment of the present invention.

DESCRIPTION OF THE PREFERRED EMBODIMENTS

Figure 1:
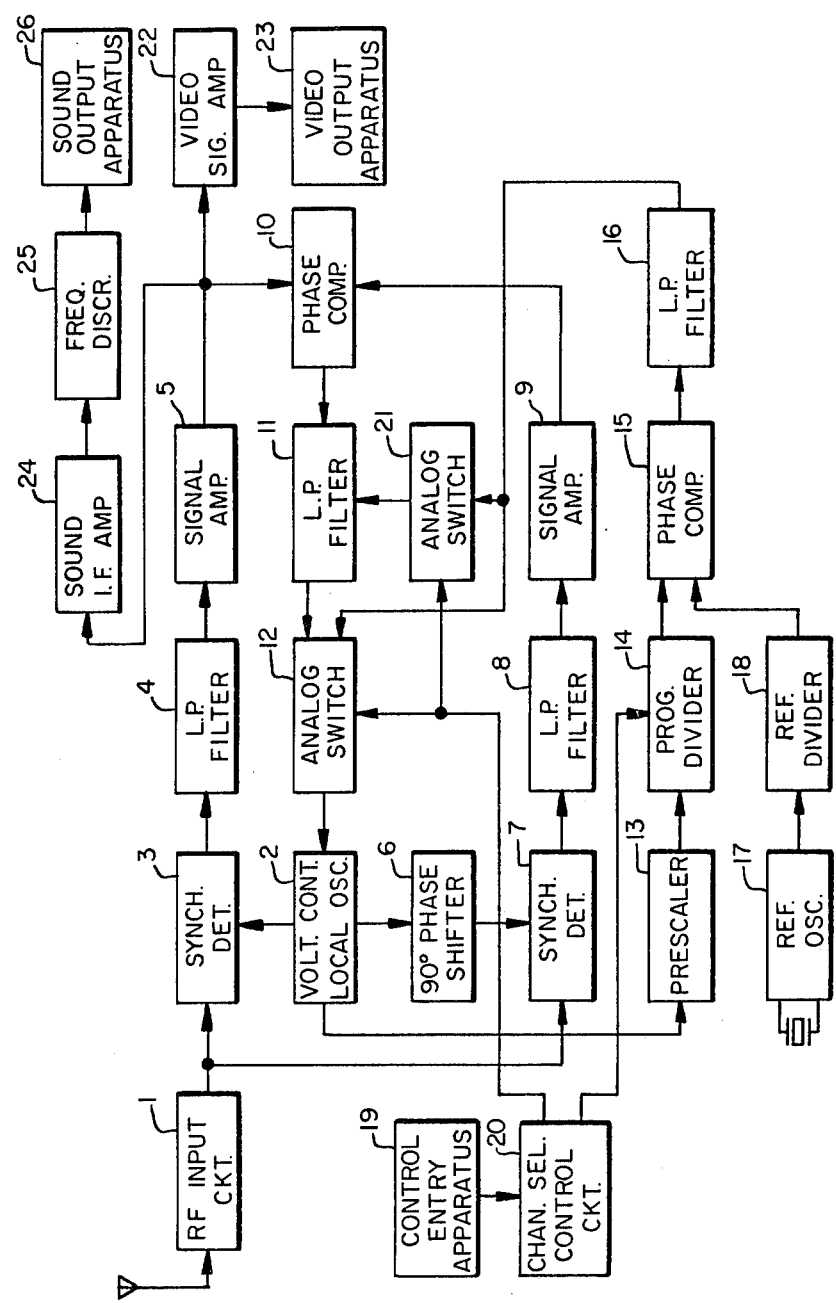
FIG. 1 is a block diagram of a first embodiment of the television synchronous receiver of the present invention.

Referring to FIG. 1, element 1 is a radio frequency input circuit; element 2 is a voltage controlled local oscillator; element 3 is a synchronous detector; element 4 is a low-pass filter; element 5 is a signal amplifier; element 6 is a 90° phase shifter; element 7 is a synchronous detector; element 8 is a low-pass filter; element 9 is a signal amplifier and element 10 is a phase comparator; element 11 is a low-pass filter; element 12 is an analog switch; and these elements form a first PPL (phase locked loop) which is known as a "Costas loop". Element 13 is a prescaler; element 14 is a programmable divider; element 15 is a phase comparator; element 16 is a low-pass filter; element 17 is a reference oscillator; element 18 is a reference divider; these elements from a second PLL with the analog switch 12 and the voltage controlled local oscillator 2.

Element 19 is a control entry apparatus; element 20 is a channel selection control circuit, and element 21 is an analog switch. According to a channel number entered into the control entry apparatus 19, one output of the channel selection circuit 20 provides a divide ratio to the programmable divider 14, and the other output of the channel selection circuit 20 switches the analog switch 12 and the analog switch 21 from the second PLL side to the first PLL side after the second PLL reaches its steady state. Element 22 is a video signal amplifier; element 23 is a video output apparatus; element 24 is a sound intermediate frequency amplifier; element 25 is a frequency discriminator, and element 26 is a sound output apparatus.

In the radio frequency input circuit 1, a plurality of television broadcast signals are entered. Let a video carrier signal of a channel of the television broadcast signals be $v_V(t)$ and a sound carrier signal of the same channel be $v_S(t)$.

Since $v_V(t)$ is vestigial sideband modulated, $v_V(t)$ is $$v_V(t) = Re\{[I(t) + jQ(t)] \exp j[\omega_V t + \phi_V]\} \quad (1)$$
$$= I(t)\cos[\omega_V t + \phi_V] - Q(t)\sin[\omega_V t + \phi_V]$$

where Re is the real part of the equation in { }; I(t) is the amplitude of the in-phase component of the carrier; Q(t) is the amplitude of the quadrature component of the carrier; $\omega_V$ is the angular frequency of the video carrier; and $\phi_V$ is the phase of the video carrier. I(t) contains a video information signal and a synchronizing signal, but I(t) will be simply called a video signal.

Let the output of the voltage controlled oscillator 2 be $$v_o(t) = A_o \cos(\omega_o t + \phi_o) \quad (2)$$

and if $v_o(t)$ is fed to the synchronous detector 3 formed by a voltage multiplier together with the video carrier signal, the output of the synchronous detector 3 is (3)

-continued
$$v_{PV}(t) = \{I(t)\cos[\omega_V t + \phi_V] - Q(t)\sin[\omega_V t + \phi_V]\}A_o\cos(\omega_o t + \phi_o)$$

$$= \frac{A_o I(t)}{2} \{\cos[(\omega_V + \omega_o)t + \phi_V + \phi_o] +$$

$$\cos[(\omega_V - \omega_o)t + \phi_V - \phi_o] - \frac{A_o Q(t)}{2} \{\sin[(\omega_V + \omega_o)t + \phi_V + \phi_o] + \sin[(\omega_V - \omega_o)t + \phi_V - \phi_o]\}$$

When the output of the voltage controlled local oscillator 2 synchronizes the video carrier, then $\omega_o = \omega_V$; therefore $$v_{PV}(t) = \frac{A_o I(t)}{2} \{\cos[2\omega_V t + \phi_V + \phi_o] + \cos[\phi_V - \phi_o]\} - \frac{A_o Q(t)}{2} \{\sin[2\omega_V t + \phi_V + \phi_o] + \sin[\phi_V - \phi_o]\} \quad (4)$$

and the output filtered through the low-pass filter 4 to remove the $2\omega_V$ terms is $$v_{PV}(t) = \frac{A_o I(t)}{2} \cos\phi - \frac{A_o Q(t)}{2} \sin\phi \quad (5)$$

where $\phi = \phi_V - \phi_o$, or $\phi$ is the error of the phase of the video carrier and the phase of the voltage controlled local oscillator 2. When $\phi = 0$, $$v_{PV}(t) = \frac{A_o I(t)}{2} \quad (6)$$

Figure 2:
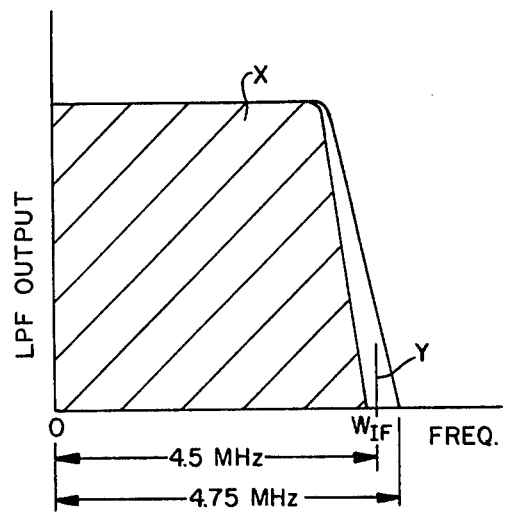
FIG. 2 is a diagram showing the characteristics of a low-pass filter which filters a synchronous detector output of the television synchronous receiver of the present invention.
Figure 3A:
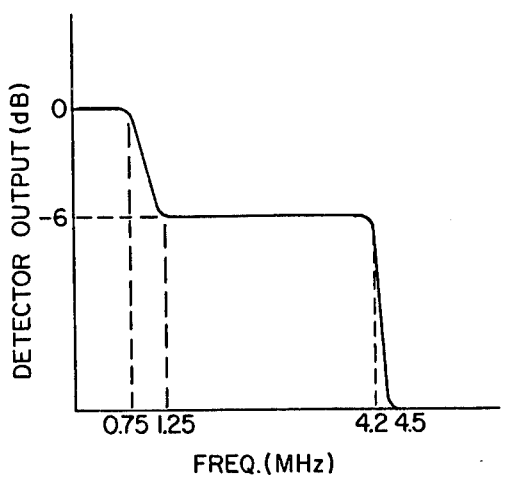
FIG. 3 (a) is a diagram showing the detected output characteristics of a synchronous detector to which a television broadcast signal, which is not conveyed through an intermediate frequency amplifier with Nyquist characteristics, is applied.
Figure 3B:
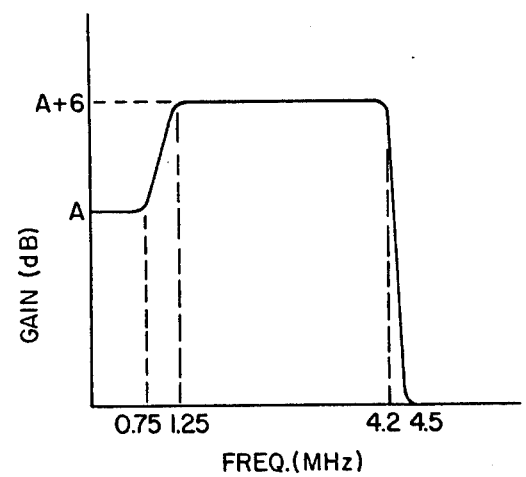

In this manner, the in-phase amplitude of the video carrier is obtained as a detected output. On the other hand, the quadrature-phase amplitude of the video carrier is not detected. The detected output $$\frac{A_o I(t)}{2}$$

is passed through the low-pass filter 4 and is amplified in the signal amplifier 5 as a video detected output which is conveyed through the video signal amplifier 22 and is displayed at the video output apparatus 23. The filtering characteristics of the low-pass filter 4 is shown in FIG. 2. Since the video signal is vestigial-sideband modulated, the detector output characteristics of the synchronous detector 3 is shown in FIG. 3 (a). Therefore, the video amplifier 22 is designed so as to have the characteristics shown FIG. 3 (b).

Since the sound ratio frequency carrier of the television broadcast signal is frequency modulated, $v_S(t)$ is written as $$v_s(t) = A_S \cos[\{\omega_S + S(t)\}t + \phi_S] \quad (7)$$

where $A_s$ is the amplitude of the sound carrier; $\omega_S$ is the angular frequency of the sound carrier; S(t) is a sound signal, and $\phi_S$ is the phase of the sound carrier.

Since the synchronous detector 3 is an analog multiplier, if $v_S(t)$ of the equation (eq., hereafter) (7) and $v_o(t)$ of eq. (2) are applied to the synchronous detector 3, the output $v_{PS}(t)$ is $$v_{PS} = A_S \cos[\{\omega_S + S(t)\}t + \phi_S]A_o\cos(\omega_o t + \phi_o) \quad (8)$$

-continued
$$= \frac{A_S A_o}{2} \cos[(\omega_S + \omega_o)t + S(t)t + \phi_S + \phi_o] +$$

$$\frac{A_S A_o}{2} \cos[(\omega_S - \omega_o)t + S(t) + \phi_S - \phi_o]$$

If the term of the frequency $\omega_S + \omega_o$ is removed by the low-pass filter 4, then $$v_{PS}(t) = \frac{A_S A_o}{2} \cos[(\omega_S - \omega_o)t + S(t)t + \phi_S - \phi_o] \quad (9)$$

$$= \frac{A_S A_o}{2} \cos[\{\omega_{IF} + S(t)\}t + \phi_{IF}]$$

where $\omega_{IF}$ is $\omega_S - \omega_o$, or sound intermediate angular frequency; $\phi_{IF}$ is $\phi_S - \phi_o$, or the phase of the sound intermediate frequency carrier. Eq. (9) shows nothing but the sound intermediate frequency carrier converted from the sound radio frequency carrier signal shown by eq. (7).

The sound intermediate frequency carrier of frequency $\omega_{IF}$ can be passed because of the characteristics of the low-pass filter 4 shown in FIG. 2. For example 4.5 MHz is taken as $\omega_{IF}$, and this diagram shows the example for an NTSC system. In other systems, the frequency may be different. The sound intermediate frequency carrier is passed through the low-pass filter 4 and is amplified in the signal amplifier 5 and sound intermediate frequency amplifier 24. The output of 24 is detected in the frequency discriminator 25, and the sound signal S(t) is obtained, which is applied to the sound output apparatus 26.

In the previous description, it is assumed that there is no error between the phase of the video carrier $v_V(t)$ and the phase of the output voltage $v_o(t)$ of the voltage controlled local oscillator 2, that is, $\phi = 0$. Such a condition is obtained by the following method.

The output of the voltage controlled local oscillator 2 is supplied to the synchronous detector 7 through the 90° phase shifter 6. Let the output of the 90° phase shifter be $v_Q(t)$, $$V_Q(t) = A_o \sin(\omega_o t + \phi_o) \quad (10)$$

If the above $V_Q(t)$ is supplied to the synchronous detector 7 together with the video carrier $v_V(t)$ of eq. (1), the output $v_{PQ}$ of the synchronous detector is $$v_{PQ}(t) = \{I(t)\cos[\omega_V t + \phi_V] - Q(t)\sin[\omega_V t + \phi_V]\}A_o\sin(\omega_o t + \phi_o)$$

$$= \frac{A_o I(t)}{2} \{\sin[(\omega_V + \omega_o)t + \phi_V + \phi_o] - \sin[(\omega_V - \omega_o)t + \phi_V - \phi_o]\} - \frac{A_o Q(t)}{2} \{-\cos[(\omega_V + \omega_o)t + \phi_V + \phi_o] + \cos[(\omega_V - \omega_o)t + \phi_V - \phi_o]\}$$

Since $\omega_o = \omega_V$, $$v_{PQ}(t) = \frac{A_o I(t)}{2} \{\sin[2\omega_V t + \phi_V + \phi_o] - \sin[\phi_V - \phi_o]\} - \frac{A_o Q(t)}{2} \{-\cos[2\omega_V t + \phi_V + \phi_o] + \cos(\phi_V - \phi_o)\}$$

If the low pass filter 8 removes the $2\omega_V t$ terms, $v_{PQ}(t)$ becomes $$v_{PQ}(t) = -\frac{A_o I(t)}{2} \sin\phi - \frac{A_o Q(t)}{2} \cos\phi \qquad (11)$$

The $v_{PQ}(t)$ is amplified in the signal amplifier 9 and is fed to the phase comparator 10.

A control voltage $v_c(t)$ is obtained by multiplying the voltages $v_{PI}(t)$ and $v_{PQ}(t)$, shown in eq. (5) and in eq. (11), respectively, in the phase comparator 10.

$$v_c(t) = v_{PI}(t) \cdot v_{PQ}(t) \qquad (12)$$

$$= -\frac{A_o^2}{8}\{I(t)^2 - Q(t)^2\}\theta - \frac{A_o^2}{4}\{I(t)Q(t)\}$$

where $\theta = 2\phi$.

Since the video carrier signal $v_P(t)$ has the vestigial sideband characteristics, the in-phase component $I(t)$ is always larger than the quadrature component $Q(t)$. Therefore, $$-\frac{A_o^2}{8}\{I(t)^2 - Q(t)^2\} \neq 0.$$

At this time, if the loop bandwidth is narrow enough to eliminate $$-\frac{A_o^2}{4}\{I(t)Q(t)\},$$

then the voltage controlled local oscillator 2 is controlled so as to cause $\theta = 0$. That is, the first PLL or the synchronous receiving system is controlled to cause $\phi = 0$.

When $\phi = 0$, as indicated in eq. (6), the in-phase component amplitude of the video carrier is detected as the detector output.

The synchronous receiving system is made by applying the so-called Costas loop to a television receiver. This application is more effective for a radio receiver than for a television receiver. The reason of the above is that the television signal contains the synchronizing signal for scanning. The television signal always contains the synchronizing signal during broadcast, that is, even if the video signal vanishes, $\{I(t)^2 - Q(t)^2\}$ in eq. (12) does not become zero. In the radio receiver, since a broadcasting signal has both sidebands, $\{I(t)^2 - Q(t)^2\}$ of eq. (12) is $I(t)^2$, and when the sound signal vanishes, this $I(t)^2$ equals zero. That is to say, if the sound signal vanishes, the control voltage $v_c(t)$ of eq. (12) cannot be obtained. Therefore, at this time, the oscillating frequency of the voltage controlled oscillator 2 drifts. The drift causes the synchronous detector 3 to generate beats, and we hear the so-called whistles from the sound output apparatus.

Next, a second PLL or a frequency synthesizer will be described. In the previous description that described the phase control of the voltage controlled local oscillator 2, it was assumed that the oscillating frequency $\omega_o(t)$ of the voltage controlled local oscillator 2 equals the input video carrier frequency $\omega_P(t)$. As previously mentioned, the synchronous receiving system behaves as a PLL. But the system behaves not only as a PLL, but also as a frequency feedback loop. The frequency synthesizer is equipped as the second PLL to synthesize the local oscillating frequency in the pull-in range. According to a channel number entered in control input apparatus 19, the channel selection circuit 20 provides a dividing ratio to the programmable divider 14. The output of the voltage controlled local oscillator 2 is previously divided and is supplied to the programmable divider 14, the divide ratio of which is provided in the manner mentioned above.

The output of the programmable divider 14 is supplied to one of the input terminal of the phase comparator 15, and the reference signal which is obtained by dividing the output of the reference oscillator 17 in the reference divider 18 is supplied to the other terminal of the phase comparator 15. The above mentioned two inputs are compared in the phase comparator 15, and its output is fed to the voltage controlled local oscillator 2 through the low-pass filter 16 and the analog switch 12. If the reference oscillator 17 is accurately controlled by a crystal resonator, the voltage controlled local oscillator 2 oscillates with a very slight frequency error with respect to the video carrier frequency of the desired selecting channel. Since this frequency error is very small, the pull-in time is short enough to allow channel selecting performance.

The output of the channel selection circuit 20 also controls the analog switch 12 and the analog switch 21 so as to open the second PLL and the close the first PLL after the frequency synthesizer reaches its steady-state. Just before the moment when the second PLL is opened, the output voltage of the low-pass filter 16 is supplied to the voltage controlled local oscillator 2 through the analog switch 21. This output voltage is also supplied to the low-pass filter 11 through the analog switch 21. Here, the analog switch 12 isolates the voltage controlled local oscillator 2 from the output terminal of the low-pass filter 11. Next, the analog switch 12 isolates the voltage controlled local oscillator 2 from the low-pass filter 16 and connects the voltage controlled local oscillator 2 to the low-pass filter 11. At the same time, the analog switch 21 is opened. Before the held voltage for synthesizing a frequency which has been supplied from the second PLL is discharged, the voltage $v_c(t)$ for controlling the voltage controlled local oscillator 2 is fed from the phase comparator 10. After such a switch operation, the first PLL is closed.

As described above, the frequency synthesizer formed by the second PLL first generates the output $v_o(t)$ of the voltage controlled local oscillator 2 having a frequency which is very close to the video carrier frequency $\omega_P(t)$ of the desired selecting channel. Next, first PLL controls the frequency $\omega_o(t)$ and the phase $\phi_o(t)$ of the above mentioned voltage controlled local oscillator output $v_o(t)$ so as to have the above mentioned frequency $\omega_P(t)$ and its corresponding phase $\phi_P(t)$, and thus, the synchronous receiving system which effects a synchronous detection for the video carrier signal and effects a frequency conversion for the sound carrier signal by the synchronous detector formed by the voltage multiplier is placed in the receiving state.

The television synchronous receiver shown in FIG. 1 needs a broad-band 90° phase shifter. The embodiment in FIG. 4 is intended to use a phase locked loop which locks when the phase error between two input signals is 90°, instead of using the 90° phase shifter.

Figure 4:
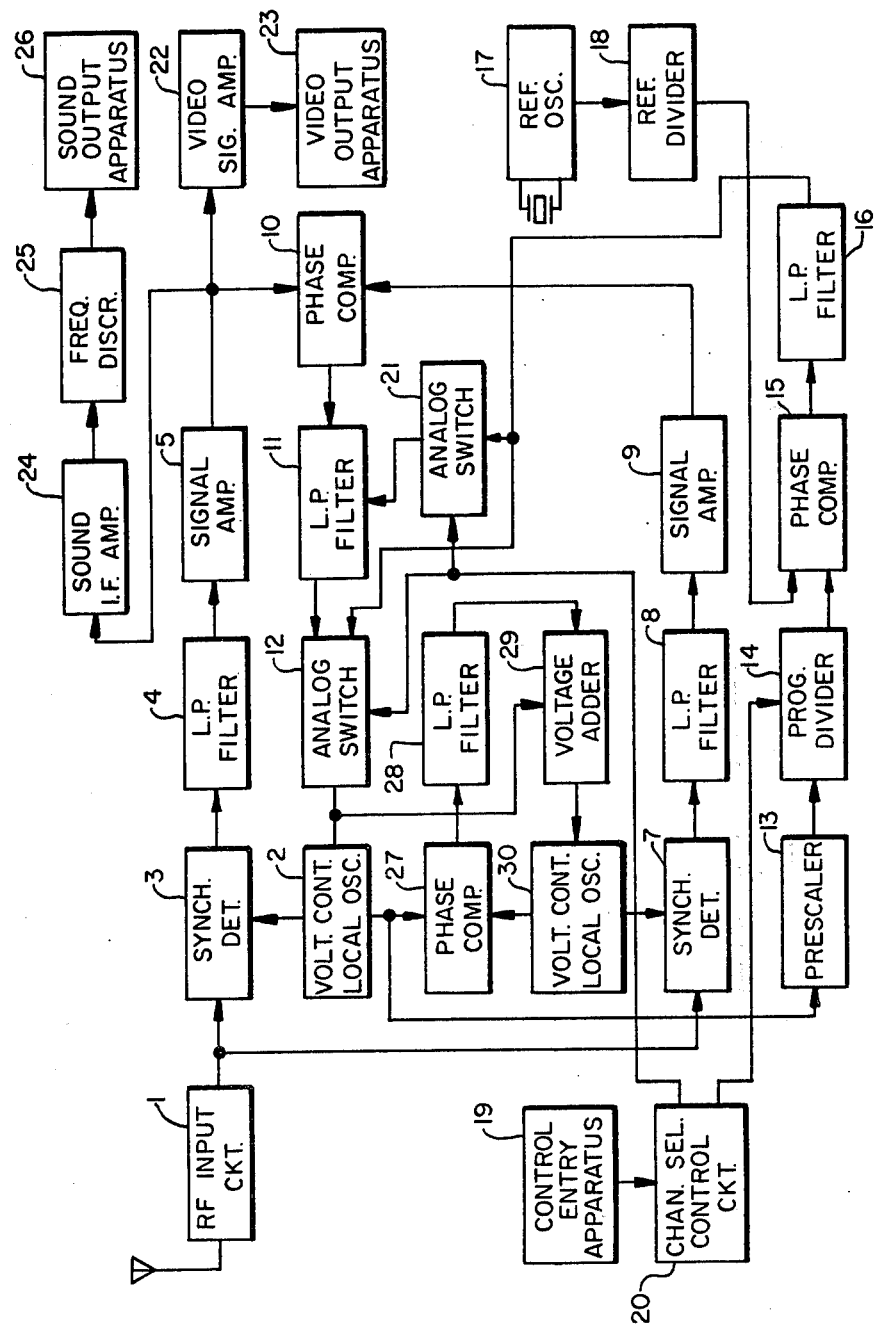
FIG. 4 is a block diagram for a second embodiment of the television synchronous receiver of the present invention.

FIG. 4 shows a block diagram of another embodiment of the present invention. In FIG. 4, elements from block 1 to 5 and from block 7 to 23 indicate the same elements from the block 1 to 5 and from block 7 to 23 of FIG. 1, respectively, and their operation is also the same. A loop which consists of a second phase comparator 27, a low-pass filter 28, a voltage adder 29 and a voltage controlled local oscillator 30, forms a third PLL and corresponds to the 90° phase shifter 6 in FIG. 1. The operation of such a loop is as follows:

Let the output $v_o(t)$ of the first voltage controlled local oscillator 2 be:

$$v_o(t) = A_o \cos[\omega_o t + \phi_o(t)] \quad (2')$$

and the output $v_Q(t)$ of the second voltage controlled local oscillator 30 be:

$$v_Q(t) = A_Q \cos[\omega_Q t + \phi_Q(t)] \quad (10')$$

The voltages $v_o(t)$ and $v_Q(t)$ are fed to the second phase comparator. Here, $\omega_o$ and $\phi_o(t)$ respectively indicate a frequency and a phase of a oscillating output of the first voltage controlled oscillator 2, and $\omega_Q$ and $\phi_Q(t)$ respectively indicate a frequency and a phase of a oscillating output of the second voltage controlled oscillator 30. In addition, the other phase comparator 10 is called the first phase comparator.

An output $v_d(t)$ of the second phase comparator 27 is:

$$\begin{aligned} v_d(t) &= v_o(t) \cdot v_Q(t) \\ &= A_o A_Q \cos[\omega_o t + \phi_o(t)]\cos[\omega_Q t + \phi_Q(t)] \end{aligned} \quad (13)$$

$$= \frac{A_o A_Q}{2} \{\cos[(\omega_o + \omega_Q)t + \phi_o(t) + \phi_Q(t)] +$$

$$\cos[(\omega_o - \omega_Q)t + \phi_o(t) - \phi_Q(t)]\}$$

If $\omega_o = \omega_Q$, $$v_d(t) = \frac{A_o A_Q}{2} \{\cos[2\omega_o t + \phi_o(t) + \phi_Q(t)] + \cos[\phi_o(t) - \phi_Q(t)]\} \quad (14)$$

When $2\omega_o$ frequency term is removed by filtering $v_d(t)$ in a low-pass filter 28, its output $v_{c1}(t)$ is:

$$v_{c1}(t) = \frac{A_o A_Q}{2} \cos[\phi_o(t) - \phi_Q(t)] \quad (15)$$

Therefore, when the difference between $\phi_o(t)$ and $\phi_Q(t)$ is $$\phi_e(t) = \phi_o(t) - \phi_Q(t) = \pm 90° \quad (16)$$

$v_{c1}(t)=0$. When $\phi_Q(t)$ leads or lags in phase with respect to the standard in such a condition, the difference of $\phi_Q(t)$ and $\phi_o(t)$ is controlled so as to become 90°. That is, the output of the first voltage controlled local oscillator 2 and the second voltage controlled local oscillator 30 have a 90° phase difference.

In the above description, we have assumed that $\omega_o = \omega_Q$, i.e., the oscillating frequency of the second voltage controlled local oscillator 30 is equal to the oscillating frequency of the first voltage controlled local oscillator 2. But the free running frequency of the second voltage controlled local oscillator 30 is not always equal to $\omega_o$, because the voltage control characteristics of the voltage controlled local oscillators 2 and 30 usually differ slightly from each other. Assuming $\Delta \omega$ be the oscillating frequency difference between the first voltage controlled local oscillator 2 and the second voltage controlled local oscillator 30, we will describe a behavior of the PLL.

If the Laplace transforms of the above mentioned $v_o(t)$, $\phi_o(t)$, $v_Q(t)$, $\phi_Q(t)$, $v_d(t)$, $v_{c1}(t)$ and $\phi_e(t)$ are $V_o(s)$, $\Phi_o(s)$, $V_Q(s)$, $\Phi_Q(s)$, $V_d(s)$, $V_{C1}(s)$ and $\Phi_e(s)$, respectively, and if the sensitivity of the phase comparator 27 is $K_d$, and the transfer function of the low pass filter 28 is $F(s)$, then $$V_d(s) = K_d[\Phi_o(s) - \Phi_Q(s)] \quad (17)$$

$$V_{c1}(s) = F(s)V_d(s) \quad (18)$$

$$\Phi_Q(s) = \frac{K_o V_{c1}(s)}{s} \quad (19)$$

From equations (17)–(19), the transfer function H(s) of the loop is:

$$H(s) = \frac{\Phi_Q(s)}{\Phi_o(s)} = \frac{K_o K_d F(s)}{s + K_o K_d F(s)} \quad (20)$$

and then:

$$\frac{\Phi_e(s)}{\Phi_o(s)} = \frac{\Phi_o(s) - \Phi_Q(s)}{\Phi_o(s)} = 1 - H(s) = \frac{s}{s + K_o K_d F(s)} \quad (21)$$

Therefore, the phase error $\Phi_e(s)$ is:

$$\Phi_e(s) = \frac{\Phi_o(s)}{s + K_o K_d F(s)} \quad (22)$$

Applying the final value theorem of Laplace transforms to equation (22), we obtain the steady-state phase error $\phi_e$, i.e., $$\phi_e = \lim_{t \to \infty} \phi_e(t) \quad (23)$$

$$= \lim_{s \to 0} \frac{s^2 \Phi_o(s)}{s + K_o K_d F(s)}$$

If there is the oscillating frequency difference $\Delta\omega$ between the first voltage controlled local oscillator 2 and the second voltage controlled local oscillator 30 as previously described, then $\Phi_Q(s) = (\Delta\omega/s^2)$.

Therefore equation (23) is followed as $$\phi_e = \lim_{s \to 0} \frac{\Delta\omega}{s + K_o K_d F(s)} \quad (24)$$

$$= \frac{\Delta\omega}{K_o K_d F(0)}$$

Constructing the low pass filter 28 by an active filter, we can make $F(0)$ to be large enough to neglect the phase difference $\phi_e$. In such a way, even when free running the voltage controlled local oscillator 30 has the frequency difference $\Delta\omega$ from the voltage controlled local oscillator 2, when the third PLL is closed, the oscillating output of the second voltage controlled local oscillator 30 has the same frequency as the first voltage controlled local oscillator. That is, we can obtain $\omega_o = \omega_Q$.

Consequently, the third PLL formed by the phase comparator 27, the low pass filter 28, the voltage adder 29 and the voltage controlled local oscillator 30 of FIG. 4 can be used in place of the 90° phase shifter of FIG. 1.

Moreover, the PLL behaves as a 90° phase shifter with a wide frequency range.

Figure 5:
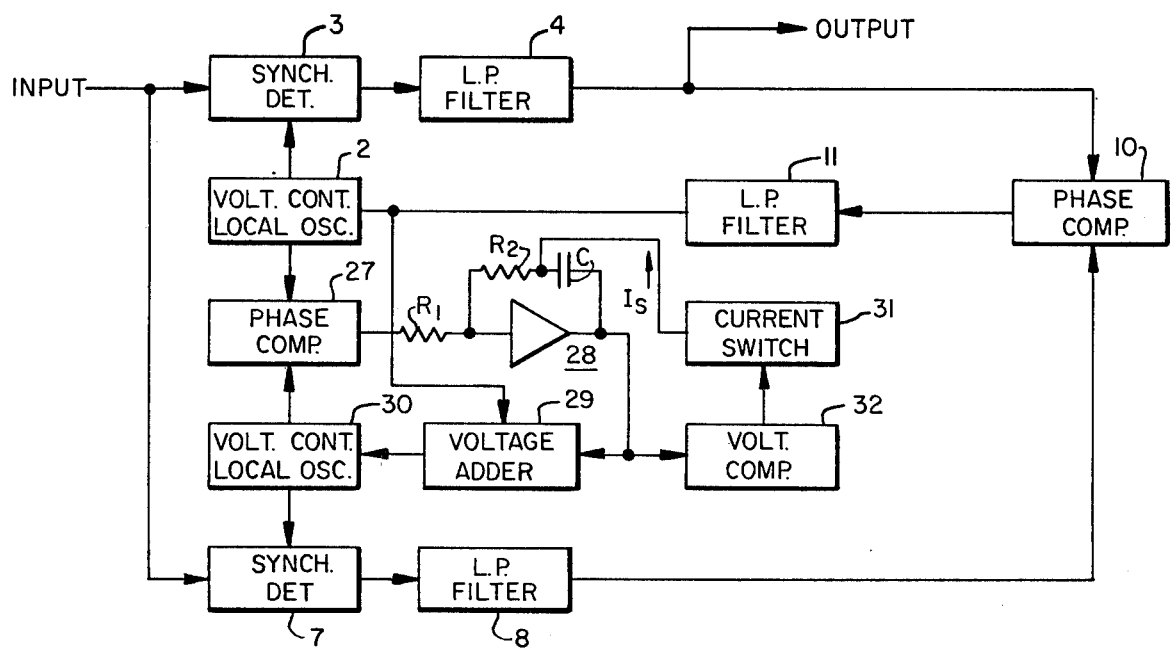
FIG. 5 is a diagram showing a 90° phase-shift PLL (phase locked loop) of the television synchronous receiver of the present invention.

FIG. 5 shows a block diagram of further another embodiment of the third PLL. Blocks 2, 3, 4, 7, 8, 10 and 11 of FIG. 5 show the same elements of 2, 3, 4, 7, 8, 10 and 11 in FIG. 4, respectively, and their operations are also the same. The loop formed by a phase comparator 27, a low-pass filter 28 and a voltage controlled local oscillator 30 forms a PLL.

There have previously been described the means to obtain $\omega_o = \omega_Q$, in FIG. 4. But such a means is effective only in the case that $\Delta\omega$ is small enough. FIG. 5 shows an effective means even if there is not such a restriction.

A constant current $I_S$ is supplied from a current switch 31 to a connecting point between a resistor $R_2$ and a capacitor C. Since an integrated voltage whose integrator constant is the product of $R_2$ and C is obtained from the low-pass filter 28, the output frequency of the second voltage controlled local oscillator 30 is swept. Consequently, the difference between the sweeping frequency and the output frequency $\omega_o$ of the first voltage controlled local oscillator 2 also becomes swept. If the sweep rate of the sweeping frequency be $\Delta\dot\omega$ rad/sec$^2$, then the input phase of the PLL which consists of the phase comparator 27, the low-pass filter 28 and the voltage controlled local oscillator 30 is $-\frac{1}{2}\Delta\dot\omega t^2$.

If an output phase of the first voltage controlled local oscillator 2 is $\phi_o(t)$, then an output phase difference between the first and the second voltage controlled local oscillator 2 and 30 is $\phi_e(t)$. If the Laplace transforms of both $\omega_o(t)$ and $\omega_e(t) - \pi/2$ are $\Phi_o(s)$ and $\Phi_e(s)$, respectively, and the sensitivity of the phase comparator 27 is $K_d$, and the control sensitivity of the voltage controlled local oscillator 30 is $K_Q$, and the transfer function of the low-pass filter 28 is $F(s)$, then, as in previously deriving equation (22), the phase error $\Phi_e(s)$ is:

$$\Phi_e(s) = \frac{s\Phi_o(s)}{s + K_Q K_d F(s)} \quad (22')$$

Since the $\Phi_o(s)$ of equation (22') is the input phase of the PLL which consists of the phase comparator 27, the low-pass filter 28 and the voltage controlled local oscillator 30, $$\Phi_o(s) = -\frac{\Delta\dot\omega}{s^3} \quad (25)$$

If the construction of the low-pass filter is the active filter shown in FIG. 5, $$F(s) = \frac{s\tau_2 + 1}{s\tau_1} \quad (26)$$

where $\tau_1 = R_1 C$, $\tau_2 = R_2 C$.

The substitution of equation (25) and equation (26) into equation (22') yields:

$$\Phi_e(s) = \frac{-\frac{\Delta\dot\omega}{s}}{s^2 + 2\zeta\omega_n + \omega_n^2} \quad (27)$$

where $\zeta = \frac{\tau_2}{2}\sqrt{\frac{K_Q K_d}{\tau_1}}$, $\omega_n = \sqrt{\frac{K_Q K_d}{\tau_1}}$.

Consequently, $\phi_e(t) - \pi/2$ in steady state becomes a constant value as $$\lim_{t \to \infty}[\phi_e(t) - \frac{\pi}{2}] = \lim_{s \to 0} s\Phi_e(s) \quad (28)$$
$$= \lim_{s \to 0} \frac{-\Delta\dot\omega}{s^2 + 2\zeta\omega_n + \omega_n^2}$$
$$= -\frac{\Delta\dot\omega}{\omega_n^2} \text{ (rad)}$$

That is, the above shows $\omega_Q(t) = \omega_o$.

But, since there remains the phase error as shown in equation (28), the current switch 31 breaks the constant current $I_s$, after passage of the time for PLL to become in steady state to make the above phase error zero. At this time, substituting the value of equation (28) into the $\Phi_o(s)$ of equation (22') and applying the final theorem, we obtain $$\phi_e(t) - \frac{\pi}{2} = \lim_{s \to 0} s\Phi_e(s) = 0 \quad (29)$$

Therefore, the phase relation shown equation (16) is obtained. That is, the phase error between the output of the first voltage controlled local oscillator 2 and the output of the second voltage controlled local oscillator 30 becomes 90°.

Consequently, the PLL which consists of the phase comparator 27, the low-pass filter 28 and the voltage controlled local oscillator 30 of FIG. 5 can be used in place of the 90° phase shifter of FIG. 1. Moreover, the PLL becomes a 90° phase shifter with a wide frequency range.

Furthermore, for the purpose of enabling the voltage controlled local oscillator 30 to start sweeping again when the above mentioned PLL is unlocked, the voltage comparator 32 is provided so as to control the direction of the output current of the current switch 31 at the moment when the output voltage of the low-pass filter 28 reaches a predetermined value.

Figure 6:
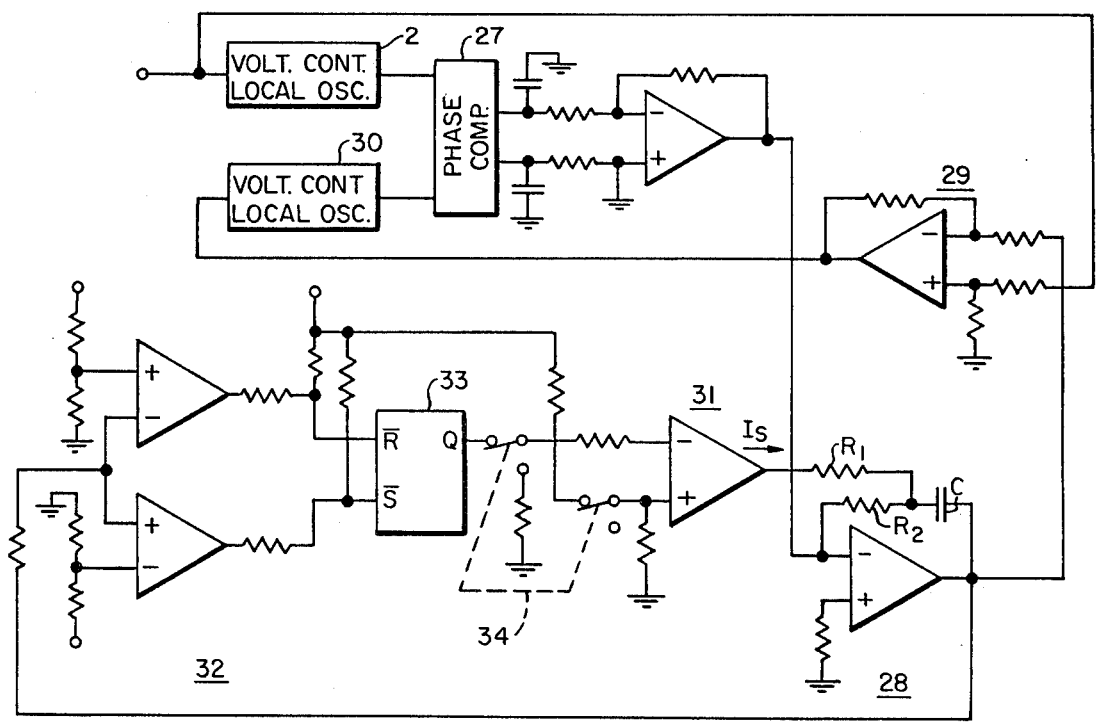
FIG. 6 is a more concrete circuit diagram of the 90° phase shift PLL.

FIG. 6 is the more concrete circuit diagram of the above described third PLL. A first voltage controlled local oscillator 2, a second voltage controlled local oscillator 30, a phase comparator 27, a low-pass filter 28, a voltage adder 29, a voltage comparator 32 and a voltage switch 31 correspond to the blocks of the same number shown in FIG. 5, respectively. A block 33 shows an R-S flip-flop, and a block 34 shows a switch to control the output $I_S$ from the current switch 31 to be zero to cause the phase error shown by equation (28). The switch 34 is turned to the opposite side shown in FIG. 6 by the detection signal of the PLL's steady state or by the signal generated after passage of enough time for the PLL to reach the steady state.

What is claimed is:

1. A television synchronous receiver comprising a synchronous receiving system and a channel selecting means, wherein said synchronous receiving system comprises:

a first voltage controlled local oscillator;
   a means for shifting the phase of an output of said first voltage controlled local oscillator by 90°;

a first and second synchronous detector for detecting an in-phase component and quadrature components of a television broadcast signal by the output of said first voltage controlled local oscillator and an output of said means for shifting the phase of the output of said first voltage controlled local oscillator by 90°, respectively;

a phase comparator having input terminals which are respectively connected to output terminals of said first and second synchronous detectors, for detecting an error between the phase of a video carrier of said television broadcast signal and the phase of the output of said first voltage controlled local oscillator;

a low-pass filter for eliminating a high frequency component of an output of said phase comparator;

a means for applying at least an output of said low-pass filter and an output of said channel selecting means to said first voltage controlled local oscillator, whereby said channel selecting means establishes the output of said first voltage controlled local oscillator at a frequency which is very near to the video carrier frequency of the television broadcast signal so as to select a desired television signal and said error between the phase of the video carrier of the television broadcast signal and the phase of the output of said first voltage controlled local oscillator is eliminated; and a means for obtaining a video signal and a sound intermediate frequency carrier from said first synchronous detector.

2. A television synchronous receiver according to claim 1, wherein said channel selecting means is a phase locked loop frequency synthesizer.

3. A television synchronous receiver according to claim 1, wherein said means for shifting the phase of the output of said first voltage controlled local oscillator by 90° is formed by another phase locked loop which consists of second voltage controlled local oscillator, a phase comparator for comparing output phases of said first and second voltage controlled local oscillators, a low-pass filter for filtering an output of said phase comparator and for applying the filtered output to said second voltage controlled local oscillator.

4. A television synchronous receiver according to claim 3, wherein said another phase locked loop has a means for sweeping the output frequency of said second voltage controlled local oscillator, and said sweeping of the output frequency of said second voltage controlled local oscillator causes the output frequency of said second voltage controlled local oscillator to come near the output frequency of said first voltage controlled local oscillator and then the output of said second voltage controlled local oscillator locks to the output of said first voltage controlled local oscillator so as to have a 90° phase error.

* * * * *